Inventor
Ralph P. Cummings.
By
Henry L. Chenery,
Attorney.

June 4, 1929.  R. P. CUMMINGS  1,715,993
APPARATUS FOR EVEN PILING SHEET MATERIAL
Filed Oct. 19, 1927  4 Sheets-Sheet 2
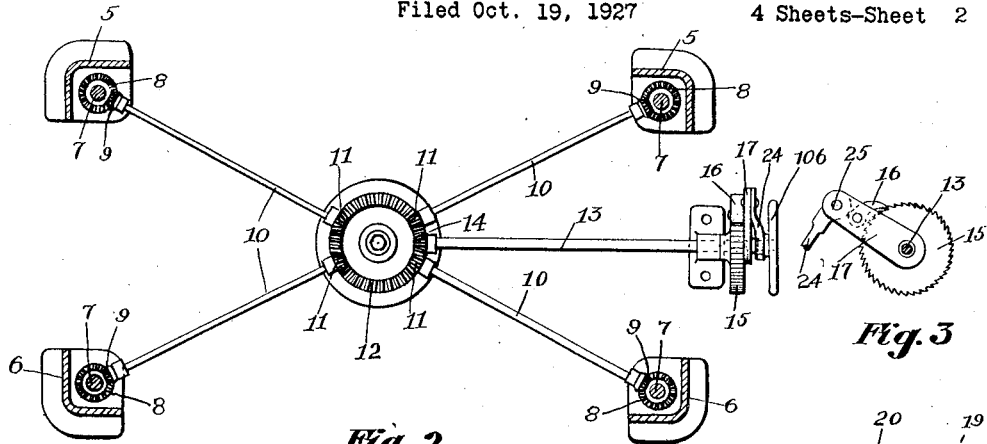
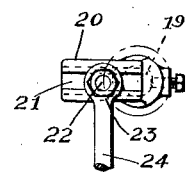
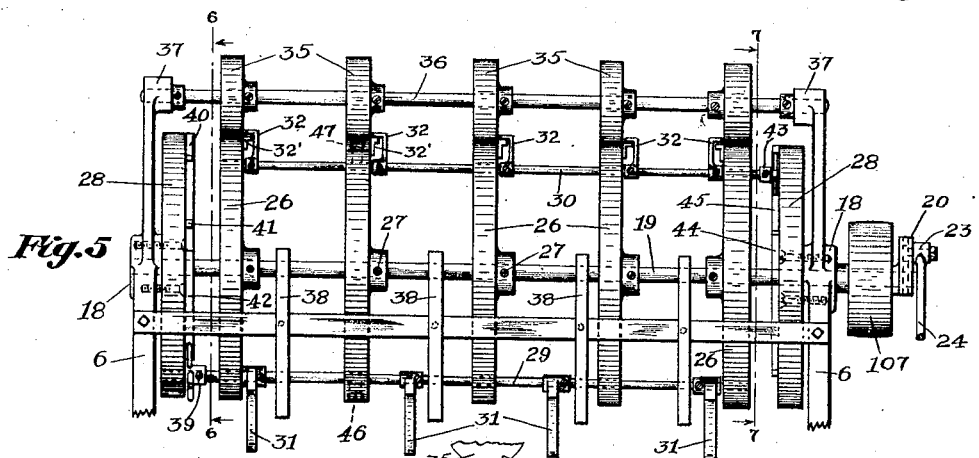
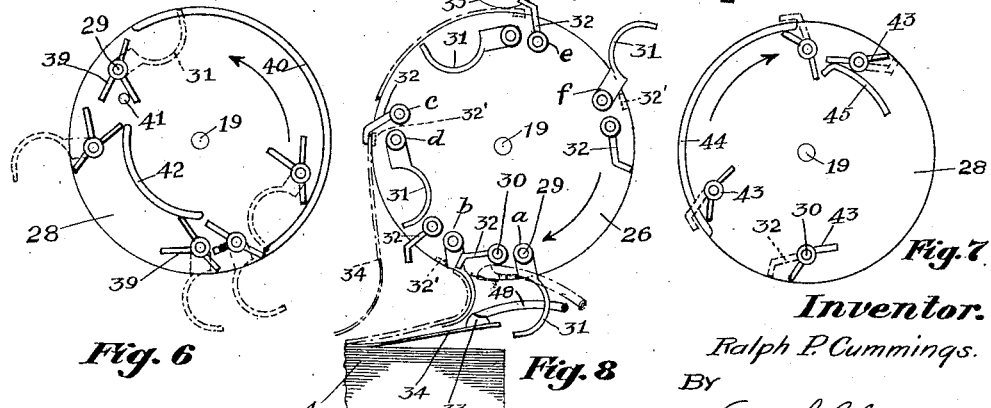
Inventor.
Ralph P. Cummings.
BY Henry L. Chenery.
ATTORNEY.

Inventor.
Ralph P. Cummings.
BY
Henry L. Chenery.
ATTORNEY.

June 4, 1929.  R. P. CUMMINGS  1,715,993
APPARATUS FOR EVEN PILING SHEET MATERIAL
Filed Oct. 19, 1927  4 Sheets-Sheet 4
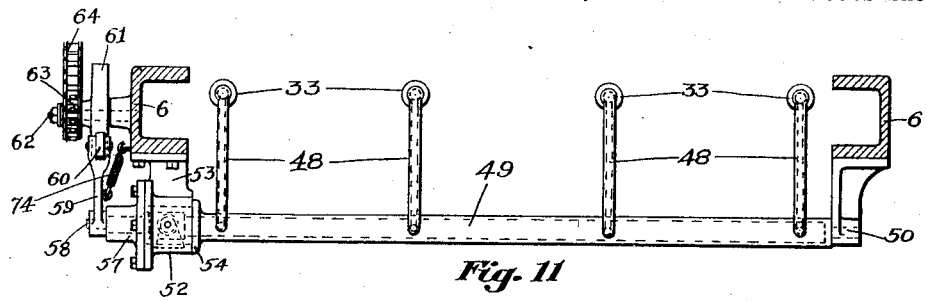
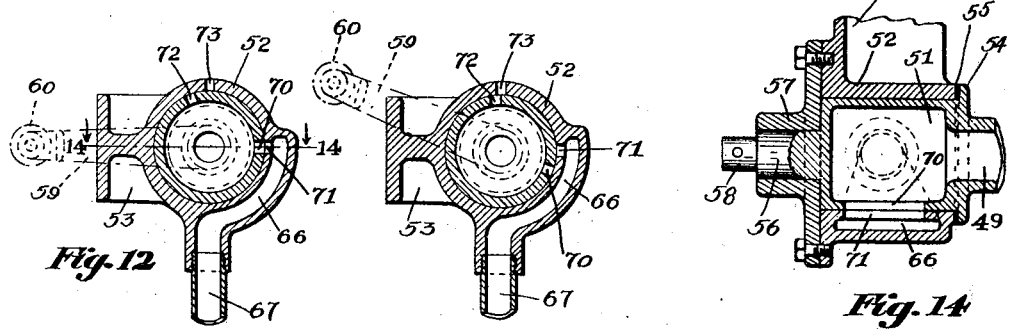
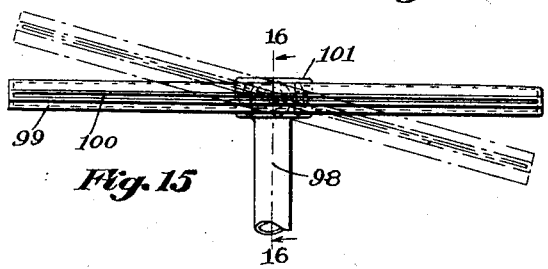 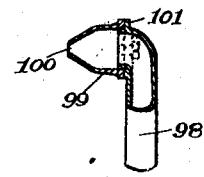
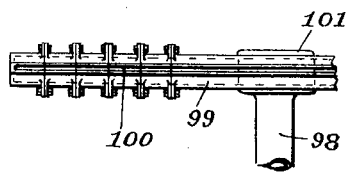
Inventor:
Ralph P. Cummings.
BY
Henry L. Chenery.
ATTORNEY.

Patented June 4, 1929.

1,715,993

UNITED STATES PATENT OFFICE.

RALPH P. CUMMINGS, OF SOUTH PORTLAND, MAINE.

APPARATUS FOR EVEN PILING SHEET MATERIAL.

Application filed October 19, 1927. Serial No. 227,316.

My invention pertains to sheet handling machinery and especially relates to improved apparatus for re-stacking and even-piling flexible material, more particularly paper sheets.

The adaptability of my machine for use in this class of work is perhaps best illustrated in its application to printing machinery, the printed sheets run off from which being assembled in piles, with the edges of the sheets placed in more or less disorder with respect to their alignment, one with the others, the machine which is the subject of this application being subsequently employed to re-align and even-pile them.

The relative position of the imprint on these sheets with respect to two of their adjacent edges is comformable in all cases as each is gauged, while being printed, from their lay edges, usually one long and one short side, and when the completed job is ready to be trimmed or cut up in the cutting machine the gauging or locating of the sheets is made from the same two edges to insure accuracy in the cut.

A large number of sheets are cut at one time and it is essential that the edges of all the sheets in the pile to be cut be in correct register or alignment,—at least so far as the two edges by which they were originally gauged while being printed are concerned.

It is, therefore, a general object of my present invention to provide an automatically operated machine which will re-stack these sheets coming from the printing machine in disorderly piles so that the lay edges of each sheet will be in vertical alignment with the corresponding edges of all the other sheets in the pile,—an operation which I shall hereinafter designate by the term, "even-piling".

A very important object of my invention concerns the method of separating the sheets from the unevenly stacked pile consisting in part of lifting the end of the sheet and then unfolding it from the sheet beneath and from the pile, in contrast to drawing or dragging the sheet across the whole length of the underlying one and obviating the difficulty met with in some separating devices of smearing the two sheets with printer's ink.

Another object is the thorough aerating to which the sheets are subjected before they finally land on the receiving table. In lifting the sheet from the pile it is gripped by devices on, and passed over a relatively large drum which elevates it sufficiently to allow of a considerable drop before it reaches the receiving table. This aerates the paper to a considerable degree. But subsequently to its leaving the drum the sheet is acted upon by air forced against its under side and by air drawn across its upper side,—in fact it is immersed in moving air and to all intents and purposes floats to the gauging means on the receiving table.

Another object is the means by which the table may be tilted into various two-way inclined positions by the actuation of a single controlling wheel.

Another object relates to the elevating means for the main stock table whereby compensation is provided for the gradual lowering of the stock pile incident to the delivery of the sheets therefrom.

The invention, which, although described as especially applicable to the separation and even-piling of paper sheets taken from printing machines is not to be understood as being limited to this purpose alone, consists in the novel features of construction hereinafter fully described and capable of fulfilling the objects hereinbefore enumerated; and in the accompanying drawings disclosing one embodiment thereof, which, at the present time I consider preferable to other possible forms of the invention,—

Fig. 2 is a plan view of the elevating portion thereof;

Figs. 3 and 4 are details of the elevating mechanism;

Fig. 5 is a front elevation of the separating mechanism;

Figs. 6, 7 and 8 are details showing diagrammatically the sequence of operations of the separating mechanism;

Fig. 11 is a plan view of the air valve and connecting parts;

Figs. 12, 13 and 14 are details of parts shown in Fig. 11;

Figure 1:
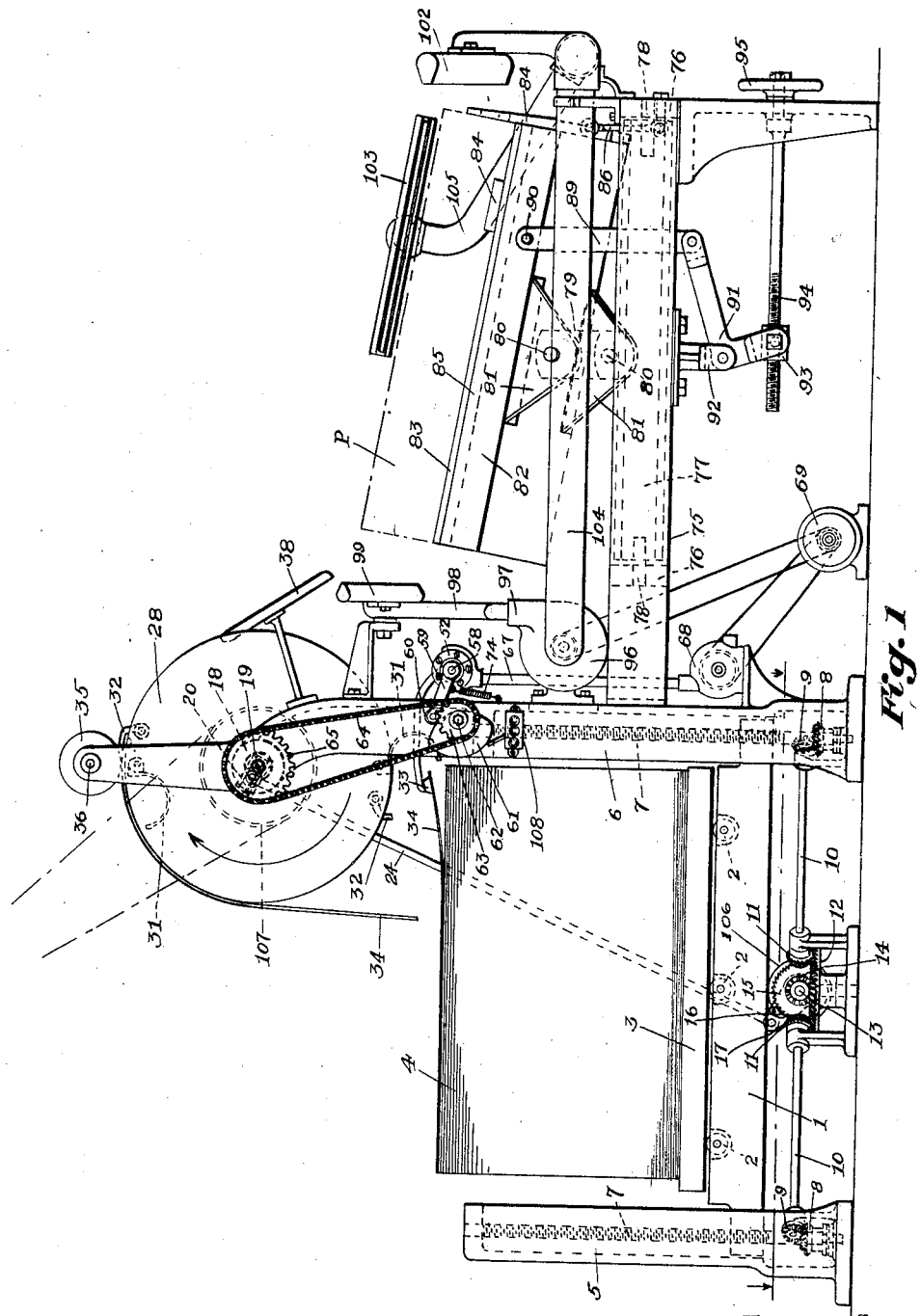
Fig. 1 is a side elevation of the apparatus.

Figs. 15 and 16 show end view and section, respectively, of the air pressure nozzle,—section taken on line 16—16, in Fig. 15, and Figs. 17 and 18 show modified forms of the air nozzle.

In all views, like reference characters identify similar parts.

1 represents the main stock table provided with rolls 2 to facilitate the movement thereonto of the stock truck 3 which supports the paper stock coming from the printing machine (not shown) in uneven piles 4.

Enclosing the corners of one end of this table 1 are short columns 5 and enclosing the corners of the other end are longer columns 6. Tapped holes at each corner of the table receive the upright screw-threaded shafts 7 on the bottom end of each of which is a gear 8 adapted to engage one of the four pinions 9, each of the latter being fixed on one of the shafts 10.

On the opposite ends of the shafts 10 are pinions 11 engageable with the master gear 12. Fixed on one end of the shaft 13 is a pinion 14 which engages and drives the master gear 12, and on the opposite end is secured the ratchet toothed wheel 15 equipped with a pawl 16 and pawl carrier 17.

Journalled in bearings 18 and extending from one to the other of the extensions to the columns 6 is a shaft 19 on the outer end of which is secured a T-slotted crank 20. Adjustably fixed in the T-slot 21 is a square-headed bolt 22, revoluble on which is the connection 23 of the rod 24, the lower end of the latter making connection at 25 with the pawl carrier 17.

It will be seen that, responsive to each revolution of the shaft 19 there is a certain movement of each of the shafts 7 and that they in turn provide a small but definite upward movement to the table 1,—the extent of this latter movement depending on the location of the bolt 22 in the T-slot 21.

Mounted on the shaft 19 and rotatable therewith, are a plurality of discs 26, adjustably secured thereto by the set-screws 27. Outwardly of the outside discs 26 are stationary discs 28, one of each of these being secured to each of the columns 6. Collectively, the discs 26 form what amounts to a drum, over a portion of which each separated sheet moves.

On diametrically opposite sides of this drum are two quite closely positioned shafts 29 and 30 (see Fig. 8), although for the purpose of avoiding confusion in the drawing but one of each is shown in Fig. 5.

On these two shafts are mounted the cam-operated turnstiles which actuate the pick-up and clamp fingers, the machine being provided with two sets, one on each side diametrically of the drum so as to enlarge the capacity of the machine; in other words, there are two sheets of paper passed over the drum in one revolution thereof.

As I have illustrated it, the circumference of the paper-carrying drum is slightly more than twice the longitudinal dimension of the largest sheet of paper of which the machine is capable of handling; but it is obvious that but one set of separating elements could be employed in which case the drum would be greatly reduced in size. And if more than two sets were used, then the drum would be some multiple of the dimension of the paper.

In Fig. 5 I have shown the pick-up fingers 31, fixed on the shaft 29, on the lower side of the drum and the clamp fingers 32, secured to the shaft 30, on the upper side; but it will be understood that, as a matter of fact, there are a pick-up finger and a clamp finger adjacent on both the top and bottom sides of the drum, as shown in Fig. 1.

In describing the sequence of movements of one pair of fingers, 31 and 32, during one cycle of the machine, which would be one revolution of the shaft 19, attention is called to Fig. 8.

Starting with the preliminary lifting of the sheet by the suction cup 33, a description of which will be hereinafter given, the rotation of the drum in the direction of the arrow will bring the pick-up finger 31 from position "a" to position "b", forcing the end of the paper sheet 34 into the arcuate form of the finger and at the same time partially lifting the sheet from the pile. Continued movement of the drum will bring the sheet under the clamp finger 32, which has been gradually moving outwardly into position to grip the sheet over the clip 32', as at "c",— the pick-up finger 31 meantime having receded to within the circumference of the drum, or at position "d".

Further rotation of the drum will lift the sheet entirely from the pile (see Fig. 1) and on reaching the central, vertical line of the drum the clamp finger 32 will be disengaged from the sheet, as at position "e", and the latter continue its forward movement by reason of its being engaged between the discs 26 and the frictionally driven rolls 35 mounted on the shaft 36 which is journalled in the bearings 37.

Subsequently to the release of the sheet from the grip of the finger 32 (position "e"), the finger 31, at position "f" suddenly moves outwardly, striking the sheet as it rolls out over the drum and forces it away from the guide arms 38, quite materially assisting the passage of the sheet to the receiving table.

The actuation of the pick-up finger 31 is accomplished by successive engagements of the turnstile 39, mounted on the shaft 29, with the projections 40, 41 and 42,—different positions of the finger during one complete revolution of the drum being diagrammatically shown in Fig. 6. The same with respect to the movements of the gripping finger 32 is illustrated in Fig. 7, the turnstile 43 mounted on the shaft 30 successively engaging the projections 44 and 45.

The shafts 29 and 30, when not subject to axial movements produced by the turnstile engagements with the several projections, are frictionally held against rotation in their bearings by means of the friction plugs 46 and 47, respectively,—or by any other suitable means to produce this result.

It will be observed that the projections which actuate the pick-up finger are placed on one of the discs 28, and those controlling the movements of the gripping finger on the other disc 28.

Reverting to a consideration of the suction cup 33, I have illustrated in Figs. 11 to 14 inclusive, a simple method of effecting the preliminary lift or separation of the top sheet from the rest of the pile. Extending from the cups 33 toward the front of the machine are branch air tubes 48 which communicate with a common or main air tube 49. One end of this main air tube is closed and the reduced portion journalled in the bearing 50.

Near the opposite end an enlarged hollow portion 51 is oscillatively fitted to a cylinder 52, the latter being supported by means of the bracket 53 to one of the columns 6. A flange 54 having any suitable packing means 55 seals the joint at this place. A hub 56 projects from the portion 55 and is journalled in the bearing of the cover 57. A pintle 58, extending from the hub 56, carries a controller arm 59 and a roll 60 in the free end of this arm engages a cam 61 which is suitably mounted on a stud 62 fixed in the column 6.

Integral with the cam 61 is a sprocket wheel 63 actuated by means of the sprocket chain 64 operable over the sprocket wheel 65, which is fixedly secured to the shaft 19. As there are two sheet separating and feeding operations in every revolution of the shaft 19, the size of the upper sprocket 65 must be twice the size of the lower one 63.

An air chamber 66 is provided on one side of the cylinder 52 communicating with the air pipe 67, which latter extends to the suction end of any air pump or exhauster 68. This pump may be driven by any prime mover, as by the motor 69.

Observing Fig. 12 it will be noticed that a port 70 in the enlarged portion 55 communicates, by way of the port 71, with the chamber 66. With the parts in the position as shown in this Fig. 12, the suction cups 33 are bearing strongly on the top sheet of the pile and the drafting action of the pump with which the interiors of the several elements are now in direct communication, provides a strong suction on the paper sheet. At the proper time, predetermined by setting the cam 61 to actuate in correct sequence with the other separating elements, the main tube 49 will start to oscillate upwardly. This will have the effect, through the agency of the cups 33, of lifting the top sheet for a distance sufficient to allow the pick-up finger to pass beneath it, immediately after which the suction hold of the cups on the sheet will be broken by the closing of the ports 70 and 71 and the opening of the vent ports 72 and 73 to the atmosphere,—as shown in Fig. 13.

A path cam might be used to operate this air valve, but I prefer the construction as disclosed, employing a positive action for the lift of the arm and a yielding return thereof by means of the spring 74. This allows of a slight overtravel of the controller arm and insures always a strong contact of the cups against the surface of the sheet.

Figure 9:
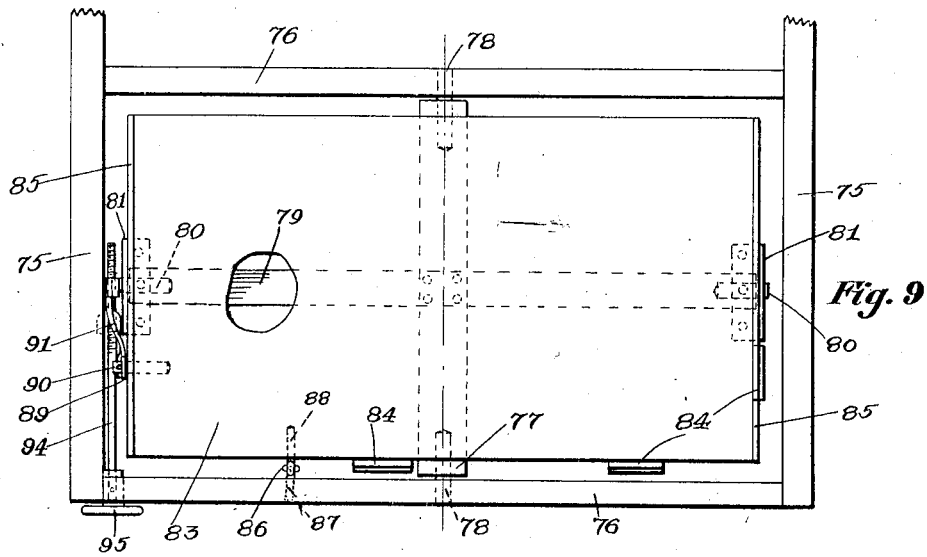
Fig. 9 is a plan view of the receiving table.
Figure 10:
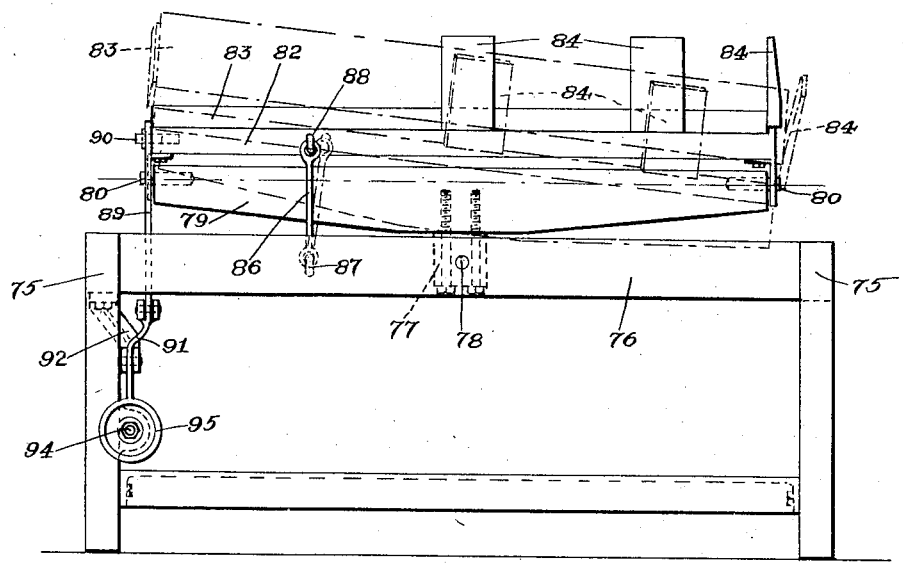
Fig. 10 is an end elevation of the same;

In Figs. 9 and 10 I illustrate the receiving table of my even-piling apparatus. Projecting outwardly from the columns 6 are side frames 75 with cross stringers 76 secured thereto. A beam 77 extending longitudinally of the machine has pivotal connections with the stringers at 78. Fixed to and located above the beam 77 is a transversely disposed beam 79 and pivoted to the ends of the latter by means of the pins 80 and the gusset plates 81 is a platform 82. Lying on and supported by this platform is a receiving table 83 with suitable side stops, or as usually called, lay fences 84. Side rails 85 on the platform serve to guide the table as it is being placed on the platform or taken off the same.

I construct my receiving table platform so that a two-way incline to the table is obtainable, and accomplish the tilting by means of one element to operate,—a hand-wheel.

The platform is hung on the universal joint principle,—oscillating, transversely of the machine, on the pins 78 and longitudinally, on the pins 80. A link 86, secured to the frame at 87 and to the platform at 88, or at some point intermediate the central longitudinal line through the machine and the operating end of the platform, holds that portion of the latter, contiguous to the point of connection with the link, substantially fixed with respect to vertical movement thereof.

The method of operating the tilting elements can more clearly be understood by observing Fig. 1. 89 is a link oscillatively secured to the platform by means of the pin 90. The lower end of this link is connected to the bell-crank 91 which is operable in the bearing 92. The opposite leg of the bell-crank is forked and within the fork operates the internally threaded nut 93 engaging the screw 94 which is actuated by the hand-wheel 95. The platform and table are inclined by raising and lowering certain portions while one side is fulcrumed at the connecting point with the link 86.

In Fig. 1 I show a blower 96, the discharge end 97 of which is in communication, through the pipe 98, with the discharge nozzle 99, shown in Fig. 15. It is provided with a long, narrow slot 100 and may be tilted to correspond with the inclination of the table by releasing the screws in the slotted bracket 101. I may elect, however, to construct this element as illustrated in Fig. 17. This provides for detaching one or more of the sections which has the effect of shortening the maximum length of the nozzle, retaining always the outer, closed-end one, so that when paper sheets narrower than the full width are being even-piled, no appreciable amount of forced air passes outside the transverse margins of the sheet.

On the forward end and on one side of the receiving table I provide air nozzles 102 and 103, respectively, constructed on substantially the same lines as is the nozzle 99, except that they are preferably made with larger orifices. These nozzles, 102 and 103, which I have not shown in Figs. 9 and 10, are in communication, by means of the pipes 104 and 105, respectively, with the inlet connection on the pump 96 (see Fig. 1).

It is obvious, then, that air is drafted over the top of the pile on the receiving table into the nozzles 102 and 103 and delivered by a forced pressure out of the nozzle 99 against the under side of each sheet as it falls onto the pile. The nozzle 99 is adjusted to and is always operated in that position which will bring the orifice 100 in a plane parallel with and slightly above the top sheet of the pile when the receiving table is loaded to capacity.

The operation of my even-piling machine is very simple.

The stock of printed sheets as it is taken from the printing press on the truck 3 is placed in position on the main table 1, and by means of the hand-wheel 106, on the shaft 13, the pile is quickly raised or lowered, as the case may be, so that the top sheet is at the proper level to accommodate the separating mechanism. The power to drive the machine is applied to the pulley 107 and the actuation of the separating elements, whose functions I have previously described, is begun.

Particular attention is called to the method of separating the top sheet from the rest of the pile, more especially because it is accomplished with the least amount of pulling and dragging of the sheet over the surface of the one beneath. The end is lifted, then gripped by the fingers and stripped off the pile with a movement somewhat analogous to tearing a sheet off a pad or block of paper. Ink smeared sheets are therefore seldom found on my receiving table. Furthermore, as is often the case in colored lithograph work where heavily inked cuts are used, the sheets are sticky and do not separate easily when pulled horizontally of the pile; but with my apparatus the top sheet is parted from the sheet beneath by a lifting action applied in a direction substantially normal to the surface of the pile.

As the sheet is carried up the side and over the top of the paper-carrying drum, comprised of the discs 26, the aerating process is started and it is continued when the bottom side of the sheet comes under the influence of the air forced from the nozzle 99 and the whole sheet drawn into the current of air created by the suction through the exhaust nozzles 102 and 103 which results in eventually bringing the sheet closely against the lining-up devices on the receiving table.

One tender only is required to operate my machine. Stationed near the receiving table he may also act as inspector, culling out sheets which have gross defects and imperfections as they pass on to the table. No counting operators are needed as I provide an odometer 108 which keeps accurate tabs on the quantity or number of sheets separated.

Obviously, various modifications in the structure and in the arrangement of parts may be possible and permit of the invention being carried out in other ways. It is to be understood, therefore, that the invention, as disclosed, is simply illustrative and that deviations from the exact mechanical construction as herein set forth are permissible, provided, however, that any such changes evolved shall be limited to the intent and meaning of the invention and are coextensive with the appended claims.

What I claim is:—

1. In apparatus for even-piling sheet material, comprising a stock-carrying table adapted to support a pile of sheets, means for pneumatically lifting the end of the top sheet in said pile, a plurality of revoluble discs, constituting a sheet-feeding drum, means on said discs for gripping said sheet and by a rearward movement unfolding it from the pile and subsequently passing the forward end of the sheet to a position slightly beyond the central, vertical line through said discs, means for releasing the gripping means on said sheet, means to continue the forward movement of said sheet, said means including a plurality of rolls engaging said discs, the sheet being interposed, means to aerate said sheet as it passes off said discs by a forced movement of air impinging on the under side of said sheet and tending to forwardly advance it, a two-way inclined receiving table, movement-limiting stops on said receiving table, and means to produce a movement of air above said sheet, travelling in the same direction thereas, and, in co-action with the movement of air first mentioned, effective to draw said sheet against said movement-limiting stops.

2. In apparatus for even-piling sheet material, comprising a stock-carrying table adapted to support a pile of sheets, screws engaging said table, means to rotate said screws, a revoluble shaft, means on said shaft co-acting with said screw-rotating means to raise said stock-carrying table a predetermined amount in each revolution of said shaft, a plurality of discs fixed on said shaft, means to raise the forward end of the uppermost sheet in said pile of sheets, an arcuate finger oscillatively mounted on each of said discs and adapted to engage, successively, each of said sheets as they are uplifted, a clamping finger on each of said discs located in adjacent relation to said arcuate finger and adapted to frictionally secure said sheet to said discs after being disengaged from said arcuate fingers, and means to continue the feeding of said sheet over said discs after being released from said clamping fingers.

3. In apparatus for even-piling sheet material, comprising a stock-carrying table adapted to support a pile of sheets, means to separate the end of the top sheet from the pile of sheets, a revoluble shaft, means to rotate said shaft, a plurality of discs fixed on said shaft, means to elevate said stock-carrying table synchronously with the rotation of said shaft, clamping means on said discs whereby said separated sheet may be gripped and partially drawn over said discs, feeding means co-acting with said discs to pass said sheet forwardly after being disengaged from said clamping means, a receiving table, means to guide said sheet from said discs on to said receiving table, and means to locate said receiving table in various two-way inclined positions.

4. In apparatus of the character described, comprising a table adapted to support a pile of sheets, a revoluble shaft, co-acting means on said shaft and said table whereby the latter may be elevated by degrees in response to the rotation of said shaft, a plurality of discs on said shaft, sheet-lifting means adapted to raise the top sheet of said pile a predetermined distance therefrom, means to clamp said sheet to said discs, means to release said sheet from said clamping means, a frame, a platform pivotally hung at all four sides, whereby a universal joint action is procured, a link making connection with said frame and with said platform at a point on its side a spaced distance from the longitudinal central line therethrough, a bell-crank making connection with said frame and with said platform at a point on its end a spaced distance from the transverse central line therethrough, means to actuate said bell-crank, a receiving table slidably mounted on said platform, an air nozzle, having a relatively long and narrow slot therein, located rearwardly of and at a higher elevation than said receiving table, and means to locate said nozzle in various angles of inclination from horizontal.

5. In apparatus of the character described, comprising a sheet-carrying table adapted to support a pile of sheets, vertically disposed screws engaging said table, means to rotate said screws whereby said table may be placed in different positions vertically, a plurality of suction cups oscillatively mounted in said apparatus and adapted to engage, successively, the sheet lying uppermost in the said pile of sheets, means to reduce the pressure in said cups to below that of the atmosphere when said cups engage said sheet and to hold this pressure for a predetermined portion of their upward movement, a revoluble shaft, a plurality of discs concentrically arranged on and fixed to said shaft, a stationary disc disposed outwardly of each of the outside discs in said plurality of discs, a shaft oscillatively mounted in and extending through all of said revoluble discs, near the periphery thereof, a plurality of pick-up fingers fixed on said last mentioned shaft, means to intermittently oscillate said pick-up fingers, a second oscillatory shaft mounted in said revoluble discs, adjacent said last mentioned shaft, a plurality of clamp fingers on said second oscillatory shaft, means to intermittently oscillate said shaft, a plurality of other revoluble clamp fingers, a plurality of other revoluble discs superimposed on and rotated by the said first mentioned discs, a receiving table, means to incline said receiving table in two directions by the actuation of one element, and means to force a current of air across said receiving table in the direction in which the sheets from said pile are fed thereto, said air current to be moved in a plane above the top sheet when said receiving table is loaded to capacity.

In testimony whereof I affix my signature.

RALPH P. CUMMINGS.